Aug. 2, 1966    M. FRENZEL    3,263,912
RADIAL SEAL
Filed June 8, 1964
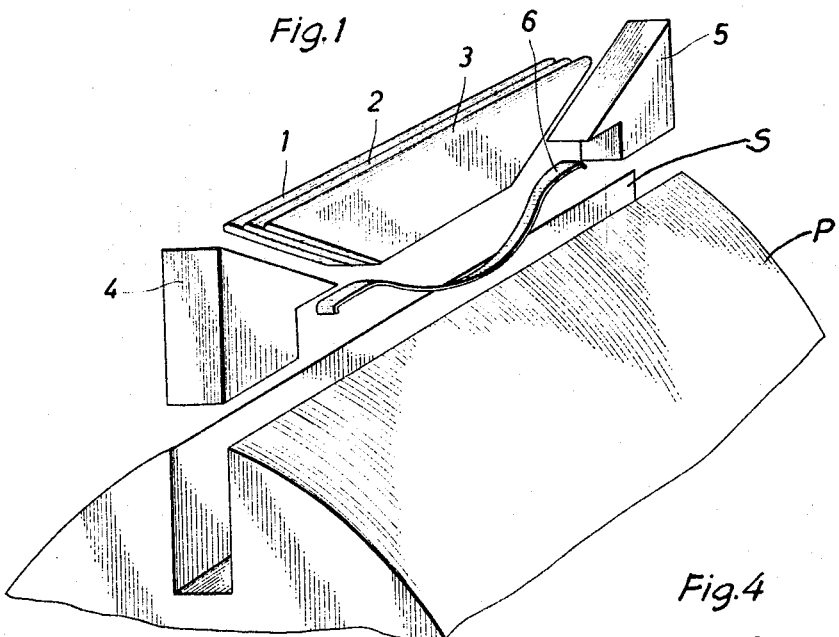
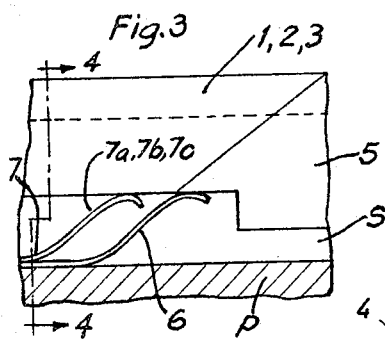
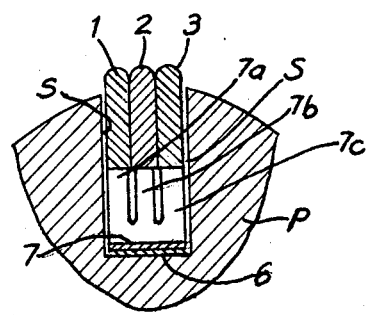
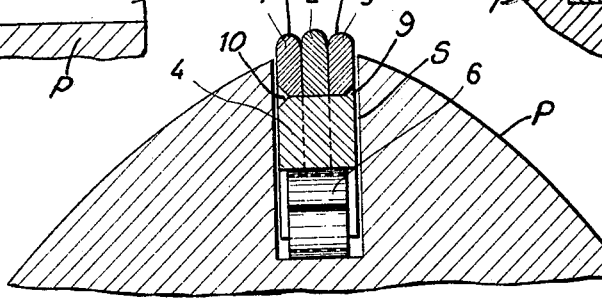
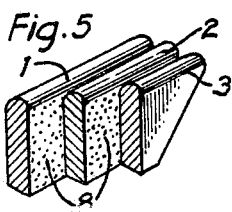
Inventor
Manfred FRENZEL
By Toulmin & Toulmin
Attys.

3,263,912
RADIAL SEAL
Manfred Frenzel, Burscheid, Germany, assignor to Goetzewerke Friedrich Goetze A.-G., Burscheid, Bezirk Dusseldorf, Germany
Filed June 8, 1964, Ser. No. 373,293
Claims priority, application Germany, July 23, 1963, G 38,263
7 Claims. (Cl. 230—145)

This invention relates to radial sealing strips or veins for rotary piston machines such as rotary piston combustion engines, pumps, compressors and the like.

Strip seals for sealing between the corners of the pistons of a rotary machine and the cylinder wall are known, and it is also known to make these strips with a centerpiece having the ends bevelled inwardly and engaged by wedge members that are sprung outwardly so that the pertinent center strip is held in sealing engagement with the cylinder.

It is further known to sub-divide the center strip into individual parts and a strip of this nature works well when the piston is rotating rapidly, but at low speed the sealing procedure is inadequate. With the foregoing in mind, the primary object of the present invention is to improve the effectiveness of a strip seal for a rotary piston.

A further object of this invention is the provision of a relatively simple multiple part seal for a rotary piston which is more effective than heretofore known strip seals.

A still further object is the provision of a multiple part strip seal for a rotary engine in which the wear on the strip seal and the piston slot which receives it is kept to a minimum.

Still another object of this invention is the provision of a strip seal for a piston of a rotary machine in which the strip is made of parts consisting of different materials to obtain the best operating characteristics of the sealing strip.

Upon further study of the specification and claims, other objects and advantages of the present invention will become apparent.

In the drawings—

FIGURE 1 is a perspective view showing a portion of a rotary piston having a slot therein for receiving a radial seal member and showing the seal member before being placed in the piston slot;

FIGURE 2 is a cross-sectional view showing the radial seal member assembled in the slot in the piston;

FIGURE 3 is a view showing the provision of individual spring members for different parts of the seal;

FIGURE 4 is a sectional view indicated by line 4—4 on FIGURE 3; and

FIGURE 5 is a perspective view showing the individual parts of the center member of the seal adhesively secured together.

The present invention is concerned with the construction of a sealing member in which the middle member which engages the cylinder wall is made up of individual strip elements in face-to-face engagement, either interconnected with each other or slidable relative to each other. Spring means are provided either acting directly on the middle member of the seal or acting on wedge-shaped end pieces pertaining thereto so that the seal is held in effective engagement with the cylinder wall at all times, including low speed operation of the piston as well as high speed operation of the piston.

The seal member slides radially in the piston slot and the members making up the seal are preferably shaped in such a manner as to inhibit wearing of the slot thereby.

Referring to the drawings somewhat more in detail, FIGURE 1 shows piston P provided with slot S for receiving the radial seal according to the present invention. This seal comprises the center strip members 1, 2 and 3 of which the outer strips 1 and 3 may consist of metal such as a good grade of cast iron. The center strip 2 is preferably non-metallic and can be made for example of carbon or graphite, or a ceramic material such as $Al_2O_3$. It is also possible, however, for the center strip to be made of metal that has imparted thereto anti-friction characteristics such as a sintered graphite bearing bronze or the like.

The outer rounded noses of the outer strip members 1 and 3 and of center strip member 2, if desired, can be plated with a wear-resistant material such as chromium.

The extreme ends of strips 1, 2 and 3 are bevelled on the inside so as to be convergent toward the center of slot S and in slight engagement with the bevelled ends of the strips are the wedge-shaped end or corner members 4 and 5 which are inclined at the same angle as the ends of the strips 1, 2 and 3.

These members are preferably good grade of cast iron but may also consist of bronze or the like so as to exhibit low friction characteristics.

Leaf spring 6 is adapted to be disposed in slot S and this will bias end or corner members 4 and 5 radially outwardly in slot S and thereby held strips 1, 2 and 3 in sealing engagement with the wall of the cylinder.

It is possible also to spring bias the individual strips 1, 2 and 3 so that they can move relative to each other and following the contour of the cylinder wall. This might be done as illustrated in FIGURES 4 and 5 by providing an additional spring 7 in the slot having finger portions 7a, 7b and 7c at the opposite ends engaging the individual strips 1, 2 and 3 and urging them radially outwardly in slot S.

It is also possible to fixedly interconnect strips 1, 2 and 3, as shown in FIGURE 5, wherein adhesive 8 which may be an epoxy resin or a metallic bonding agent, is provided which fixedly interconnects strips 1, 2 and 3.

In FIGURE 2 it will be seen that the wear between the sealing member and the flanks of slot S can be kept to a minimum by bevelling or rounding off the corners of the outer strips 1 and 3 and of the end corner pieces 4, as indicated at 9 and 10. This will prevent the corners from scraping on the flanks of slot S and will thus inhibit wear thereof. The other corners of the end corner pieces could similarly be bevelled to inhibit scraping in the same manner as indicated at 9 and 10.

The sealing member according to the present invention has improved sealing and wearing characteristics but is simple to manufacture and assemble in a rotary piston machine.

It will be understood that this invention is susceptible to modification in order to adapt it to different usages and conditions and, accordingly, it is desired to comprehend such modifications within this invention as may fall within the scope of the appended claims.

What is claimed is:

1. A radial seal for being disposed in the axial slot of a rotary piston and comprising a plurality of individual strips in face-to-face engagement and substantially as long at their outer edge as said slot, and having their ends bevelled so as to be convergent toward the center of the strips, end members having inclined upper surfaces engageable with the bevelled ends of said strips and each thereof as wide as the plurality of strips so as to bear across the entire width of the assembled strips, and spring means at the radially inner side of said seal for biasing the said seal radially outwardly of the piston slot in which it is mounted.

2. A seal according to claim 1, in which said spring means comprises a single leaf spring bearing on only said end members.

3. A seal according to claim 1, in which said spring means comprises first spring means biasing said end members radially outwardly, and second spring means individually biasing said strips radially outwardly.

4. A seal according to claim 1, in which the radially outer edges of said strips are rounded and at least some of the said strips have the said rounded outer edges thereof coated with a wear-resistant material.

5. A seal according to claim 4, in which said wear-resistant material is chromium and is applied to the strips by plating.

6. A radial seal for being disposed in the axial slot of a rotary piston and comprising a plurality of individual strips in face-to-face engagement and substantially as long at their outer edge as said slot, and having their ends bevelled so as to be convergent toward the center of the strips, end members having inclined upper surfaces engageable with the bevelled ends of said strips and each thereof as wide as the plurality of strips so as to bear across the entire width of the assembled strips, and spring means at the radially inner side of said seal for biasing the said seal radially outwardly of the piston slot in which it is mounted, said strips being directly bonded to each other to form a single integral unit and comprising at least three strips with the outer strips comprising metal and the strips therebetween comprising a low friction material selected from the class of non-metallic materials and sintered metal.

7. A seal for a rotary piston and comprising at least three relatively thin flat strips in side-by-side engagement having their radially outer edges rounded and having their ends bevelled so as to be convergent toward the center of the strips, end members having bevelled upper surfaces engaging the bevelled ends of said strips, and each end member being as wide as the assembly of strips, spring means operable for biasing said strips and end members radially outwardly when the seal is placed in the axial slot in a rotary piston, and at least some of the corners of said strips and end members that are disposed within the slot in the piston being bevelled or rounded to inhibit scraping of the walls of the slot as the seal moves radially therein.

References Cited by the Examiner
UNITED STATES PATENTS

| | | | |
|---|---|---|---|
| 342,721 | 5/1886 | Wood | 123—8 |
| 1,776,452 | 9/1930 | Rosenthal | 123—8 |
| 3,046,069 | 7/1962 | Schmidt | 138—8 |
| 3,176,909 | 4/1965 | Maurhoff | 230—145 |
| 3,186,284 | 6/1965 | Fuhrmann | 123—8 |
| 3,215,340 | 11/1965 | Lamm | 123—8 |

MARK NEWMAN, *Primary Examiner.*

W. J. GOODLIN, *Assistant Examiner.*